W. H. FROST.
GAS SCRUBBER.
APPLICATION FILED MAR. 2, 1910.
998,491.
Patented July 18, 1911.
2 SHEETS—SHEET 2.
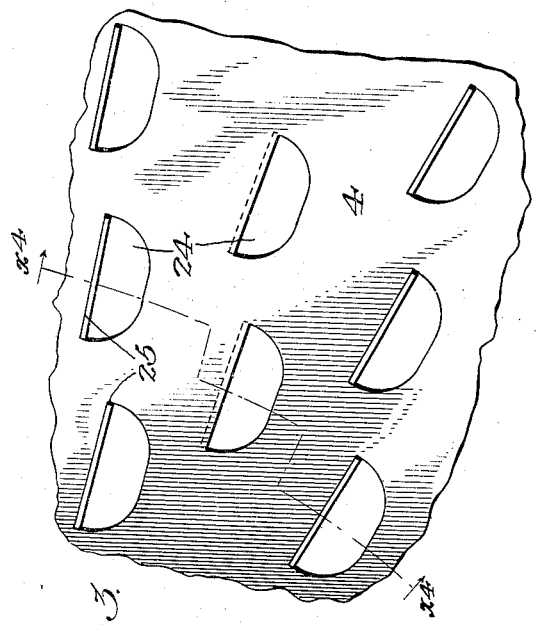
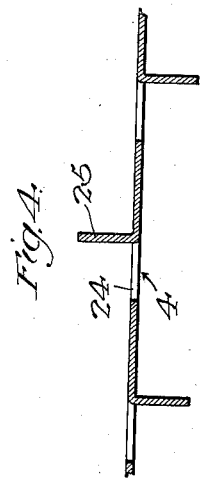
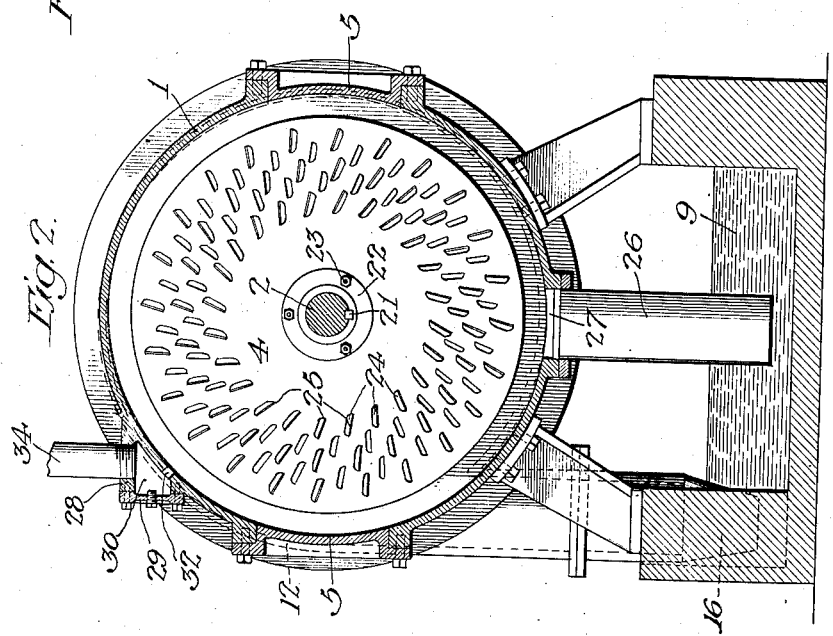
Witnesses:
Inventor:
Warren H. Frost.

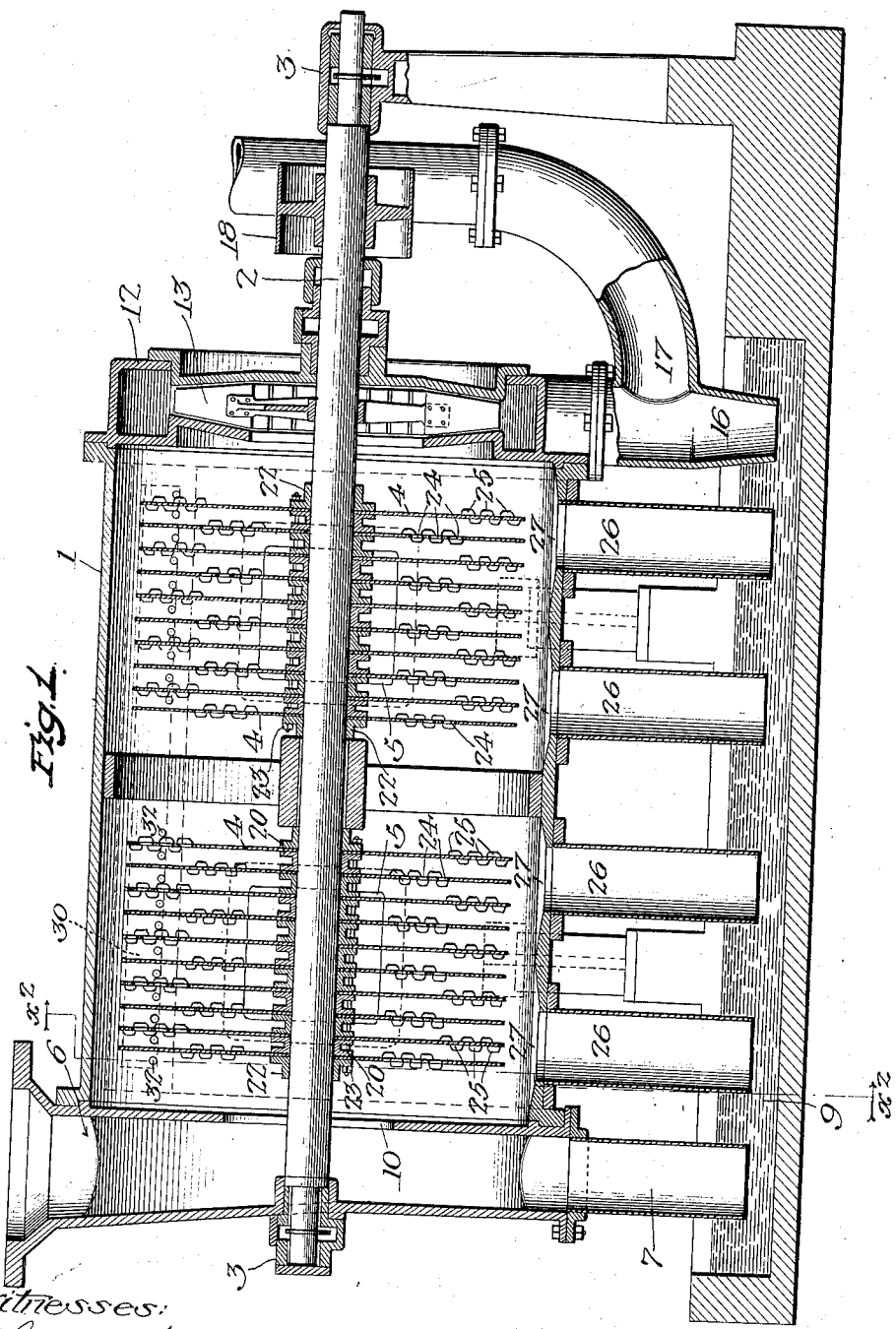

UNITED STATES PATENT OFFICE.

WARREN H. FROST, OF LOS ANGELES, CALIFORNIA.

GAS-SCRUBBER.

998,491.

Specification of Letters Patent.

Patented July 18, 1911.

Application filed March 2, 1910. Serial No. 546,924.

*To all whom it may concern:*

Be it known that I, WARREN H. FROST, a citizen of the United States, residing at Los Angeles, in the county of Los Angeles and State of California, have invented a new and useful Gas-Scrubber, of which the following is a specification.

The main object of this invention is to provide a scrubber which will separate fine particles of carbon, lamp black, tar or other solid ingredients from gas or air and deliver the gas or air in a substantially clean condition.

Gas as produced by ordinary processes from petroleum or other carbonaceous matter contains carbon or lamp black in such a fine state of division that it is difficult to eliminate it, as the solid matter tends to remain in suspension in the gas on account of the extreme smallness of the particles.

My invention provides for elimination of such solid matter by first causing the small particles to coalesce into larger masses, thereby diminishing their power of suspension in the gas and at the same time bringing the particles into effective contact with water so that the water can take hold of the particles of carbons, etc., and carry or separate them from the gas.

The accompanying drawings illustrate the invention, and referring thereto:—

Figure 1 is a longitudinal section of the scrubber. Fig. 2 is a transverse section on line $x^2$—$x^2$ Fig. 1. Fig. 3 is a detail view of a portion of one of the rotary disks of the scrubber. Fig. 4 is a section on the line $x^4$—$x^4$ in Fig. 3.

The scrubber comprises a casing or shell 1, preferably cylindrical in form, and provided with means for conducting the gas or air into and out of the shell, and a rotary member journaled in the shell, said rotary member consisting of a shaft 2 journaled in bearings 3 and of a plurality or series of disks 4 carried by said shaft. A gas intake 6 is provided at one end of the case, said intake being, for example, formed as a vertical conduit adapted for attachment to the delivery pipe of a gas producer. In case said gas producer is provided with a water supply ejector at its outlet, the said conduit will be adapted for connection to the lower end of such ejector, and as shown in the drawing will be provided with a downward extension 7 opening at the bottom into a drain or sump 9 for receiving the waste water, said water in said drain or sump forming a water seal at the lower end of said conduit extension. In other cases, however, where dry gas or air is supplied to the scrubber, the conduit may extend in any other direction into the scrubber. Said conduit is provided with a lateral outlet 10 forming the inlet of the scrubber cylinder or shell 1. At the other end of the cylinder shell suction means may be provided consisting of a fan or blower comprising a casing 12 and a runner 13, said runner being carried by the aforesaid shaft 2.

It will be understood that the invention is not limited to the use of such a suction means, as the air or gas may be forced through the scrubber by pressure or by natural draft. It is preferred, however, to employ the suction fan, particularly in connection with the method of gas production which involves suction at the outlet of the producer. I prefer to provide the suction means with an outlet conduit 16 extending vertically downward tangentially to the casing 12 and dipping into the water in the drain or sump connection 9 to form the water seal, the gas outlet from this conduit being taken off laterally, as shown at 17. Manholes 5 are provided for shell or casing 1.

Shaft 3 is provided with suitable drive means, for example, pulley 18. The disks 4 on said shaft are preferably of sheet metal, each disk having a central perforation to fit on said shaft and said disks being separated or spaced apart by washers 20. The disks 4 are provided with keyways to receive a key 21 extending longitudinally of the shaft, and end collars 22 are provided at each end of the series of disks, said collars, and the washers 20, and disks 4 being perforated to receive bolts 23 which clamp the said parts tightly into position on the shaft 2. Disks 4 are perforated, as shown at 24, for passage of the gas or air therethrough, and in order to produce the most effective contact of the gas with the disks the perforations are preferably arranged in annular zones which are located at different radial distances in the successive plates so that the gas after passing through a perforated zone in any one disk will encounter an unperforated or plain portion in the next disk, thereby causing the gas to pass through the scrubber shell in a tortuous path. It is preferred to provide, adjacent to each perforation, a wing 25 or surface extending transversely to the plane of rotation of the disks, said wing being formed by bending up the portion punched out to form the perforation, and in order to give a balanced construction so that wind pressure on the disks will be equalized on both sides thereof, these wings are preferably bent up on opposite sides of the disks in alternate circumferential rows. The action of the disks on the water, and solid matter contacting therewith, when the disks are rotated at high velocity, is to produce a centrifugal motion, and in cases where it is desirable to reduce the amount of such motion the wings are inclined to the radial direction, as shown, the inclination being outward and forward so that in the forward rotation the impact of these wings on the water and solid matter will produce more or less of an inward tendency toward the center of rotation. The shell or casing 1 is provided with a series of discharge outlets for the dirty water and solid matter, said outlets consisting of pipes or tubes 26 extending downwardly from the bottom portion of the case or shell into the drainage conduit 9, and the portions of the bottom of the shell intermediate said discharge pipes being preferably inclined or dipping toward said discharge pipes, as shown at 27, to facilitate the discharge of the water and carbon black etc. Means are provided for supplying water to the upper portion of the shell, said means consisting for example of a trough formed by a flange 28 extending along the outside of the shell at the upper portion thereof and a closure plate 29, the trough or chamber 30 so formed communicating with the interior of the shell by a longitudinal series of perforations 32 through the shell wall. The water supply pipe 34 extends into said chamber 30.

The operation will be described in connection with the cleaning of gas from a gas producer, where the gas is drawn from the producer by suction. The gas passes into the inlet conduit 6, and any water that comes along with the gas, for example, in a case where a water ejector is used, is discharged through the outlet at the bottom of said conduit, the gas passing through the opening 10 into the shell 1 and being drawn through said shell by the operation of the fan or suction means 13. In its passage through the shell, the gas passes partly in the space around the disks 4 between said disks and the shell wall, and partly through the perforations in the disks. The water supply is turned on at 34 and passes into the shell through the perforations 33 and is directed thereby onto the disks 4 and into the spaces between said disks. In the rotation of the disks 4 by shaft 2, the water which falls onto the disks is broken up or atomized particularly by the beating action of the wings 25 on the disks, so that the entire shell 1 is occupied with a fine mist or spray through which the gas has to pass, and such mist or spray is in a state of violent motion particularly in a circumferential direction. The portion of the gas which passes between the disks 4 and the shell wall is subjected to the action of this water spray at the densest portion thereof, and where the motion is most violent, thereby insuring that such portion of the gas will be subjected to effective scrubbing action by contact and force impact of the water particles with the solid particles in the gas. The portion of the gas which passes through the perforations in the plate 4 is then subjected in the first place to contact with the disks, the surfaces of which are covered with water, secondly, to the beating action of the wings adjacent to the perforations, and third, to the direct action of the spray itself in the spaces between the disks. I have found that the drawing or forcing of the gas through the perforations in the disks, when the disks are rotating as described, is itself sufficient to cause considerable compacting or coalescence of the particles and mechanical action of the disk surfaces on the particles of gas, but this compacting effect is considerably increased by the provision of the wings 25 which provide a surface over which the gas has to flow after or before its passage through the perforations, thereby increasing the efficiency of contact between the gas and the surface and insuring the beating together of the solid particles, which results in their aggregation into larger masses enabling their separation from the gas. This aggregation of the solid particles into larger masses is an essential feature of the process, for the solid particles are originally in such a fine state of division that the particles of water can not be brought into contact therewith owing to the suspending effect of the air, but by subjecting the solid particles to the mechanical action of the disk surfaces, moving at high velocity, the suspending action of the gas is overcome and the particles are forcibly brought into contact with one another and with the water, enabling their removal from the gas. When such aggregation of the particles has been effected, the centrifugal action due to the rotary velocity of the water and particles becomes effective in causing separation, these heavier particles tending to move to the wall of the shell and being discharged through the outlets 26 into the drainage means 9. The clean gas passes from the outlet 10 of the shell through the suction casing 12, and the outlet conduit 16, and gas outlet 17, any water carried with the gas being discharged through the vertical outlet at the bottom of conduit 16 into the drainage means 9 by the combined effect of gravity and of its tangential movement imparted by the runner 13, the conduit 16 extending vertically downward and tangentially to the motion of the runner 13.

What I claim is:—

1. A scrubber comprising a shell, a shaft journaled to rotate therein, a series of disks on said shaft provided with perforations, gas inlet and outlet means at opposite ends of said shell, water supply means communicating with the interior of the shell, drainage means extending from the lower portion of said shell, and means for rotation of said shaft, said disks being provided with transversely extending wings adjacent to said perforations.

2. A scrubber comprising a shell, a shaft journaled to rotate therein, a series of disks on said shaft provided with perforations, gas inlet and outlet means at opposite ends of said shell, water supply means communicating with the interior of the shell, drainage means extending from the lower portion of said shell, and means for rotation of said shaft, said disks being provided with transversely extending wings adjacent to said perforations, said wings extending on opposite sides of the disks.

3. A scrubber comprising a shell, a shaft journaled to rotate therein, a series of disks on said shaft provided with perforations, gas inlet and outlet means at opposite ends of said shell, water supply means communicating with the interior of the shell, drainage means extending from the lower portion of said shell, and means for rotation of said shaft, said disks being provided with transversely extending wings adjacent to said perforations, said wings being inclined to the radial direction.

4 A scrubber comprising a shell, a shaft journaled to rotate therein, mixing means carried by said shaft, gas inlet and outlet means at opposite ends of said shell, water supply means communicating with the interior of the shell, drainage means extending from the lower portion of said shell, means for rotation of said shaft, a suction fan at the outlet of the shell, a delivery pipe extending vertically downward and tangentially from said fan, a drainage means into which said delivery connection extends, and a gas outlet extending laterally from said delivery connection.

In testimony whereof, I have hereunto set my hand at Los Angeles, California, this 15th day of February, 1910

WARREN H. FROST

In presence of—
ARTHUR P. KNIGHT,
FRANK L. A. GRAHAM.